United States Patent
Ikeda

(10) Patent No.: US 11,157,749 B2
(45) Date of Patent: Oct. 26, 2021

(54) CROWD STATE RECOGNITION DEVICE, LEARNING METHOD, AND LEARNING PROGRAM

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 16/614,442

(22) PCT Filed: May 21, 2018

(86) PCT No.: PCT/JP2018/019465
§ 371 (c)(1),
(2) Date: Nov. 18, 2019

(87) PCT Pub. No.: WO2018/216648
PCT Pub. Date: Nov. 29, 2018

(65) Prior Publication Data
US 2020/0202139 A1    Jun. 25, 2020

(30) Foreign Application Priority Data
May 22, 2017 (JP) .............................. JP2017-100642

(51) Int. Cl.
*G06K 9/62* (2006.01)
*G06K 9/00* (2006.01)

(52) U.S. Cl.
CPC ....... *G06K 9/00778* (2013.01); *G06K 9/6259* (2013.01)

(58) Field of Classification Search
None
See application file for complete search history.

(56) References Cited

U.S. PATENT DOCUMENTS

| | | | |
|---|---|---|---|
| 2009/0034793 A1* | 2/2009 | Dong | G06K 9/00778 382/103 |
| 2016/0110602 A1 | 4/2016 | Chujo et al. | |
| 2016/0110642 A1 | 4/2016 | Matsuda et al. | |

(Continued)

FOREIGN PATENT DOCUMENTS

| | | |
|---|---|---|
| JP | 2014-229124 A | 12/2014 |
| JP | 2016-080550 A | 5/2016 |
| WO | 2014/207991 A1 | 12/2014 |

OTHER PUBLICATIONS

International Search Report for PCT/JP2018/019465 dated Aug. 21, 2018 (PCT/ISA/210).

*Primary Examiner* — Idowu O Osifade
(74) *Attorney, Agent, or Firm* — Sughrue Mion, PLLC

(57) ABSTRACT

A training data storage means 81 stores, as training data, a crowd state image that is a captured image of a crowd state made up of a plurality of persons, a crowd state label that is a label indicating the crowd state of the image, and a crowd position label that is a label indicating information enabling positions of the plurality of persons included in the crowd state image to be specified. A learning means 82 learns a discriminator for recognizing the crowd state from a recognition object image. The learning means 82 learns the discriminator having the crowd state image as input and the crowd state label and the crowd position label as output, using the training data stored in the training data storage means 81.

13 Claims, 14 Drawing Sheets

(56) References Cited

U.S. PATENT DOCUMENTS

| | | | |
|---|---|---|---|
| 2016/0132755 A1* | 5/2016 | Ikeda | G06K 9/00778 |
| | | | 382/159 |
| 2016/0133025 A1* | 5/2016 | Wang | G06K 9/00778 |
| | | | 348/135 |
| 2016/0335490 A1* | 11/2016 | Wang | G06K 9/00778 |
| 2016/0379061 A1* | 12/2016 | Zhang | G06T 7/75 |
| | | | 382/103 |
| 2018/0005047 A1* | 1/2018 | Yu | G06N 3/0445 |
| 2018/0253606 A1* | 9/2018 | Dhua | G06F 16/583 |
| 2018/0322366 A1* | 11/2018 | Lim | G06K 9/6255 |
| 2019/0333241 A1* | 10/2019 | Yano | G06M 7/00 |

\* cited by examiner

CROWD STATE
IMAGE EXAMPLE

CROWD STATE
(LABEL) EXAMPLE   DIRECTION 1    DIRECTION 2    DIRECTION 3    DIRECTION 4

RECOGNITION
EXAMPLE

| CROWD STATE IMAGE EXAMPLE | | |
| --- | --- | --- |
| CROWD STATE (LABEL) EXAMPLE | NON-ABNORMAL CROWD (NUMBER OF PERSONS: LESS THAN n) | ABNORMAL CROWD (NUMBER OF PERSONS: NOT LESS THAN n) |

RECOGNITION EXAMPLE

CROWD POSITION LABEL OF
TWO DIMENSIONS

CROWD POSITION LABEL OF
TWO DIMENSIONS

CROWD POSITION LABEL OF
TWO DIMENSIONS

CROWD POSITION LABEL OF
(k × 2) DIMENSIONS

CROWD POSITION LABEL OF
(k × 2) DIMENSIONS

ND LEARNING
CROWD STATE RECOGNITION DEVICE, LEARNING METHOD, AND LEARNING PROGRAM

CROSS REFERENCE TO RELATED APPLICATIONS

This application is a National Stage of International Application No. PCT/JP2018/019465 filed May 21, 2018, claiming priority based on Japanese Patent Application No. 2017-100642 filed May 22, 2017, the disclosure of which is incorporated herein in its entirety by reference.

TECHNICAL FIELD

The present invention relates to a crowd state recognition device, a learning method, and a learning program. The present invention particularly relates to a crowd state recognition device that can robustly recognize a state of a crowd made up of a plurality of persons from an image in a congested environment, and a learning method and a learning program for a crowd state.

BACKGROUND ART

A method of recognizing a crowd state from an image is described in, for example, Patent Literature (PTL) 1. Examples of information indicating a crowd state include the number of persons, crowd direction, abnormal crowd, and orderliness. With the method described in PTL 1, images are synthesized based on an instruction set beforehand to thereby generate, as training data necessary for learning, a crowd state image including overlapping of persons indicated by a partial region and a label indicating a crowd state. The generated training data is used to learn a discriminator for recognizing a crowd state, and the learned discriminator is used to robustly recognize a crowd state in each partial region in an image in a congested environment.

CITATION LIST

Patent Literature

PTL 1: International Patent Application Publication No. 2014/207991

SUMMARY OF INVENTION

Technical Problem

With the method described in PTL 1, there is a possibility that the discriminator for recognizing the crowd state, which is obtained as a result of learning, is not optimally learned, and thus there is a possibility that the discriminator for recognizing the crowd state does not have maximum recognition accuracy. Since a crowd state is made up of a plurality of persons, image patterns used for crowd state learning are complex and widely varying. With the method described in PTL 1, however, learning is performed using only a few types of information, i.e. a crowd state image and a label of the number of persons, and therefore improvement in recognition accuracy is limited.

The present invention accordingly has an object of providing a crowd state recognition device that can improve accuracy in recognizing a state of a crowd made up of a plurality of persons, and a learning method and a learning program for a crowd state.

Solution to Problem

A crowd state recognition device according to the present invention includes: a training data storage means which stores, as training data, a crowd state image that is a captured image of a crowd state made up of a plurality of persons, a crowd state label that is a label indicating the crowd state of the image, and a crowd position label that is a label indicating information enabling positions of the plurality of persons included in the crowd state image to be specified; and a learning means which learns a discriminator for recognizing the crowd state from a recognition object image, wherein the learning means learns the discriminator having the crowd state image as input and the crowd state label and the crowd position label as output, using the training data stored in the training data storage means.

Another crowd state recognition device according to the present invention includes: a dictionary storage means which stores a dictionary represented by a network structure forming a neural network and a weight and a bias of a network, as a dictionary used in a discriminator for recognizing a crowd state from an image; and a crowd state recognition means which recognizes a crowd state and a crowd position from a recognition object image, using a discriminator that has the recognition object image as input and the crowd state and the crowd position as output, is based on the dictionary stored in the dictionary storage means, and has a common network common to the crowd state and the crowd position on an input side of the neural network and independent networks independently provided respectively for the crowd state and the crowd position on an output side of the neural network.

A learning method according to the present invention is a learning method for learning a discriminator for recognizing a crowd state made up of a plurality of persons from a recognition object image, the learning method including learning, with use of training data including a crowd state image that is a captured image of the crowd state, a crowd state label that is a label indicating the crowd state of the image, and a crowd position label that is a label indicating information enabling positions of the plurality of persons included in the crowd state image to be specified, the discriminator having the crowd state image as input and the crowd state label and the crowd position label as output.

A learning program according to the present invention is a learning program for use in a computer for learning a discriminator for recognizing a crowd state made up of a plurality of persons from a recognition object image, the learning program causing the computer to execute a learning process of learning, with use of training data including a crowd state image that is a captured image of the crowd state, a crowd state label that is a label indicating the crowd state of the image, and a crowd position label that is a label indicating information enabling positions of the plurality of persons included in the crowd state image to be specified, the discriminator having the crowd state image as input and the crowd state label and the crowd position label as output.

Advantageous Effects of Invention

According to the present invention, accuracy in recognizing a state of a crowd made up of a plurality of persons can be improved.

DESCRIPTION OF EMBODIMENT

A best mode for carrying out the present invention will be described in detail below, with reference to the drawings.

Exemplary Embodiment 1

Figure 1:
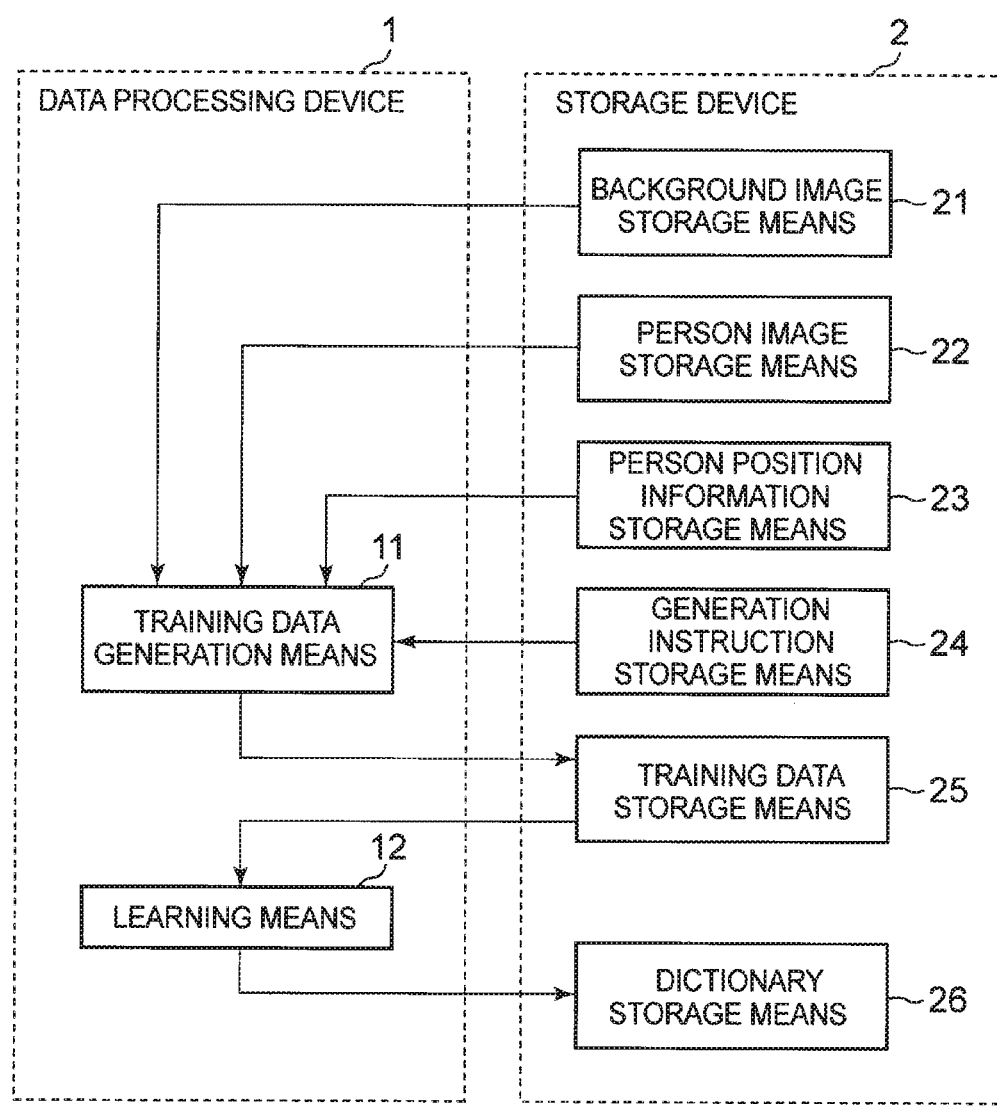
FIG. 1 is a block diagram depicting an example of the structure of Exemplary Embodiment 1 of a crowd state recognition device according to the present invention.
Figure 2:
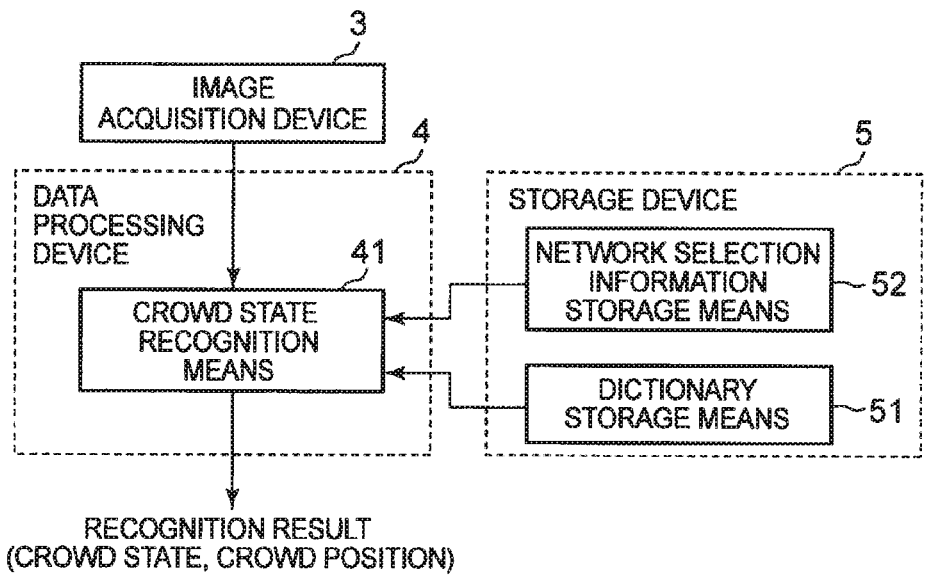
FIG. 2 is a block diagram depicting an example of the structure of Exemplary Embodiment 1 of a crowd state recognition device according to the present invention.

FIGS. 1 and 2 are each a block diagram depicting an example of the structure of a crowd state recognition device according to the present invention. FIGS. 1 and 2 each depict an example of the structure of part of the crowd state recognition device according to Exemplary Embodiment 1. The single-headed arrows in FIGS. 1 and 2 simply represent information flow directions, and do not preclude bidirectionality.

The structure depicted in FIG. 1 has a function of learning training data for recognizing a state (crowd state) of a crowd made up of a plurality of persons from an image. The device having the structure depicted in FIG. 1 can therefore be regarded as a training data learning device. The structure depicted in FIG. 2 has a function of recognizing a crowd state from an image using a discriminator based on a dictionary obtained as a result of learning.

The crowd state recognition device in FIG. 1 includes a data processing device 1 for operating according to program control, and a storage device 2 for storing information. The data processing device 1 will be described in detail later. The storage device 2 includes a background image storage means 21, a person image storage means 22, a person position information storage means 23, a generation instruction storage means 24, a training data storage means 25, and a dictionary storage means 26.

The storage device 2 (more specifically, the background image storage means 21, the person image storage means 22, the person position information storage means 23, the generation instruction storage means 24, the training data storage means 25, and the dictionary storage means 26) is implemented, for example, by a magnetic disk or the like.

The background image storage means 21 stores a collection of images (background images) of backgrounds not including persons, as a background image group.

The person image storage means 22 stores a collection of person images to each of which attribute information such as the direction of a person, the imaging angle (angle of depression) of the person, lighting on the person, and the posture, clothes, figure, and hairstyle of the person is added, as a person image group. Herein, one person image relates to one person.

The person position information storage means 23 stores a collection of images (person region images) of person regions corresponding to the person images stored in the person image storage means 22, as a person region image group. That is, an image of a person region is an image of a region in which a person is captured in a person image. The person region has position information of the person in the image added thereto. The position information of the person is, for example, the center position of the person, a rectangle enclosing the person, the center position of the head, a rectangle enclosing the head, etc. The position information of the person may be automatically determined based on the person region image.

The generation instruction storage means 24 stores an instruction to generate an image (crowd state image) of a crowd state made up of a plurality of persons from the foregoing information of background images, information of person images, and information of person region images. This generation instruction includes, for example, the arrangement of persons, the directions of the persons, and the number of persons in the image generation, person attribute information in the person image selection, and person image size in the generation. A crowd state image generated based on the instruction serves as training data for the below-described learning means. The generation instruction can therefore be regarded as an instruction including details on training data generation.

The training data storage means 25 stores training data generated by a training data generation means 11. The training data includes a captured image (crowd state image) of a crowd state made up of a plurality of persons, a label (crowd state label) indicating the crowd state of the image, and a label (crowd position label) indicating information enabling the positions of the plurality of persons (crowd) included in the crowd state image to be specified.

Specific examples of the crowd position label will be given in the description of the training data generation means 11 below. The training data stored in the training data storage means 25 is not limited to training data generated by the training data generation means 11, and may be training data manually collected and stored.

The dictionary storage means 26 stores a dictionary of a discriminator obtained as a result of learning by a learning means 12. Since this exemplary embodiment assumes learning in a neural network, the dictionary includes a network structure forming the neural network and the weight and bias of the network.

The data processing device 1 includes the training data generation means 11 and the learning means 12. The training data generation means 11 generates, based on a crowd state image generation instruction, an image of a crowd state and a label (crowd state label) indicating the crowd state of the image as basic training data for learning, from information of background images, information of person images, and information of person region images. Specifically, information of a person image includes the person image and additional information, and information of a person region image includes the person region image and additional information. The training data generation means 11 in this exemplary embodiment further generates a label (crowd position label) indicating information enabling the positions of the plurality of persons to be specified for the image of the crowd state, as indirect training data.

Specifically, based on the generation instruction stored in the generation instruction storage means 24, the training data generation means 11 selects and processes background images, person images, and person region images from the information of background images stored in the background image storage means 21, the information of person images stored in the person image storage means 22, and the information of person region images stored in the person position information storage means 23, to generate an image of a crowd state made up of a plurality of persons. Any method may be used by the training data generation means 11 to generate the image of the crowd state based on the generation instruction.

Further, based on the crowd state image generation instruction, the training data generation means 11 generates a label (crowd state label) indicating the crowd state of the crowd state image. A method of generating a crowd state label will be described below, using specific examples depicted in FIGS. 3 to 6. FIGS. 3 to 6 are each an explanatory diagram depicting a specific example of a crowd state image and a crowd state label.

Figure 3:
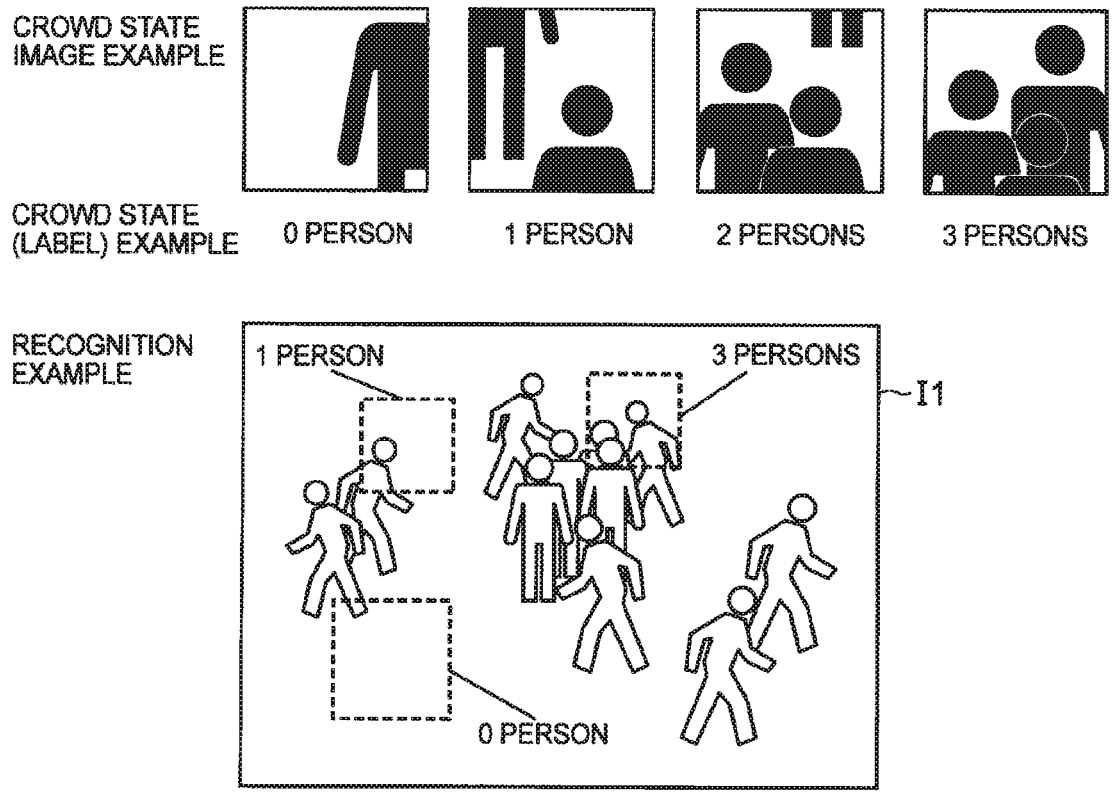
FIG. 3 is an explanatory diagram depicting a specific example of a crowd state image and a crowd state label.

For example, suppose the training data generation means 11 generates each crowd state image based on a generation instruction designating 0 to 3 as the number of persons, as depicted in FIG. 3. In this case, the designated number of persons (e.g. "0 person", "3 persons") is directly used as the label indicating the crowd state. That is, the training data generation means 11 selects part of the crowd state image generation instruction and sets it as the label indicating the crowd state. By generating such a label as training data, for example when recognizing a crowd from an image I1 depicted in FIG. 3, the number of persons representing the crowd state can be specified, too.

Figure 4:
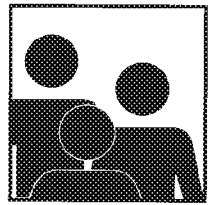
FIG. 4 is an explanatory diagram depicting a specific example of a crowd state image and a crowd state label.
Figure 4:
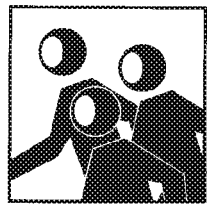
Figure 4:
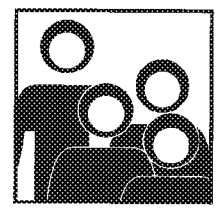
Figure 4:
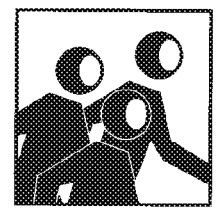
Figure 4:
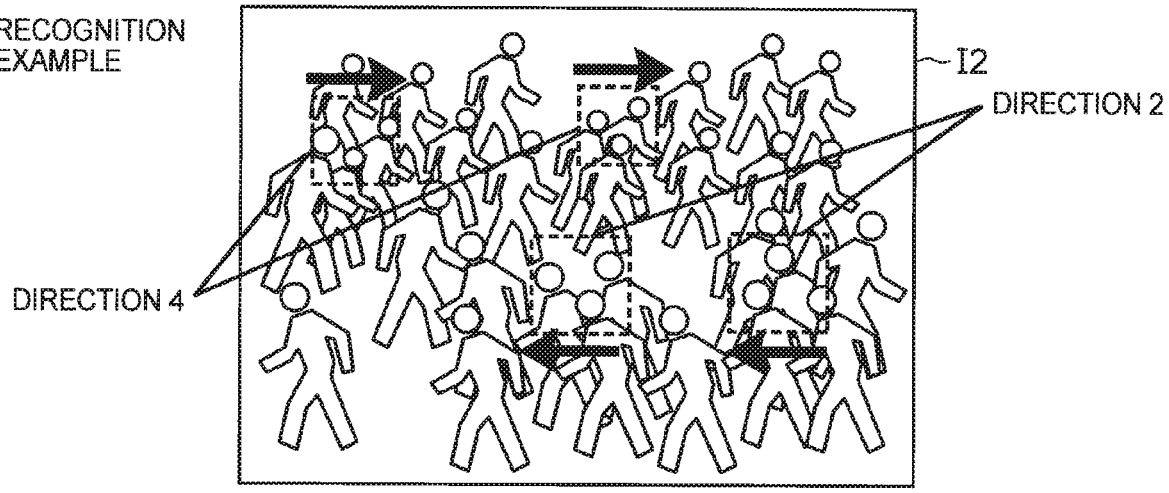

Likewise, suppose the training data generation means 11 generates each crowd state image based on a generation instruction designating the facing direction of persons (directions 1 to 4), as depicted in FIG. 4. Here, the direction 1 is the upward direction of the image, the direction 2 is the leftward direction of the image, the direction 3 is the downward direction of the image, and the direction 4 is the rightward direction of the image. In this case, the designated direction (e.g. "direction 1", "direction 4") is directly used as the label indicating the crowd state. That is, in this case, too, the training data generation means 11 selects part of the crowd state image generation instruction and sets it as the label indicating the crowd state. By generating such a label as training data, for example when recognizing a crowd from an image I2 depicted in FIG. 4, the facing direction or moving direction of the crowd state can be specified, too.

Figure 5:
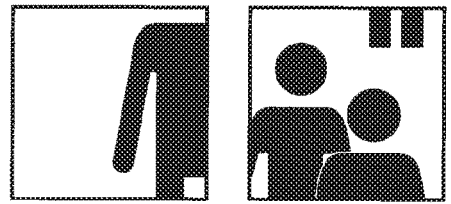
FIG. 5 is an explanatory diagram depicting a specific example of a crowd state image and a crowd state label.
Figure 5:
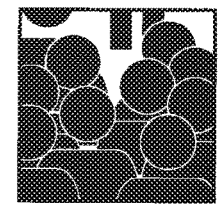
Figure 5:
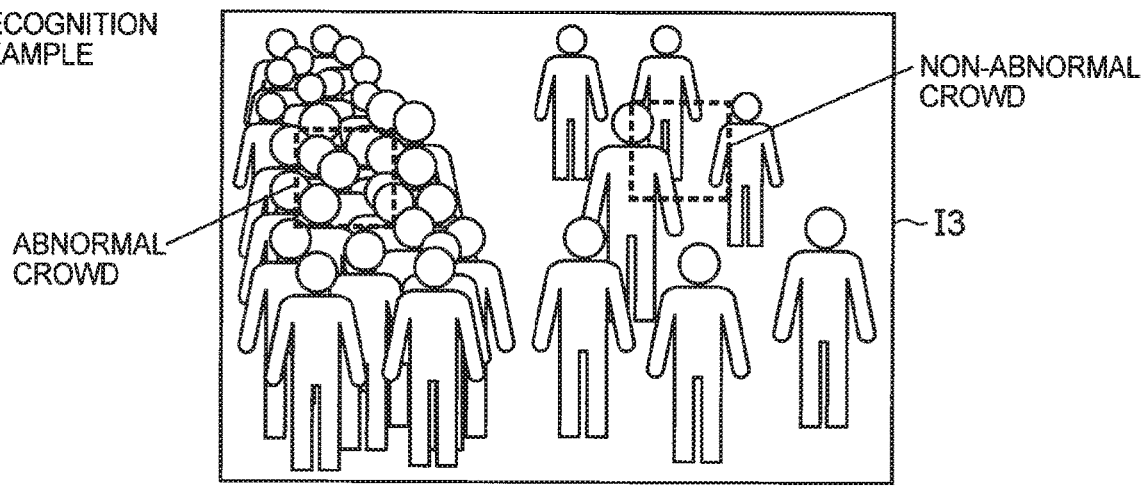

The training data generation means 11 may generate a label converted based on information in the instruction. For example, suppose the training data generation means 11 generates each crowd state image based on a generation instruction designating a threshold n for the number of persons, as depicted in FIG. 5. In this case, the training data generation means 11 may set a label of a crowd state image including a number of persons not less than the threshold n as "abnormal crowd", and set a label of a crowd state image including a number of persons less than the threshold n as "non-abnormal crowd". By generating such a label as training data, for example when recognizing a crowd from an image I3 depicted in FIG. 5, whether the crowd is in an abnormal state or a non-abnormal state can be specified, too.

Figure 6:
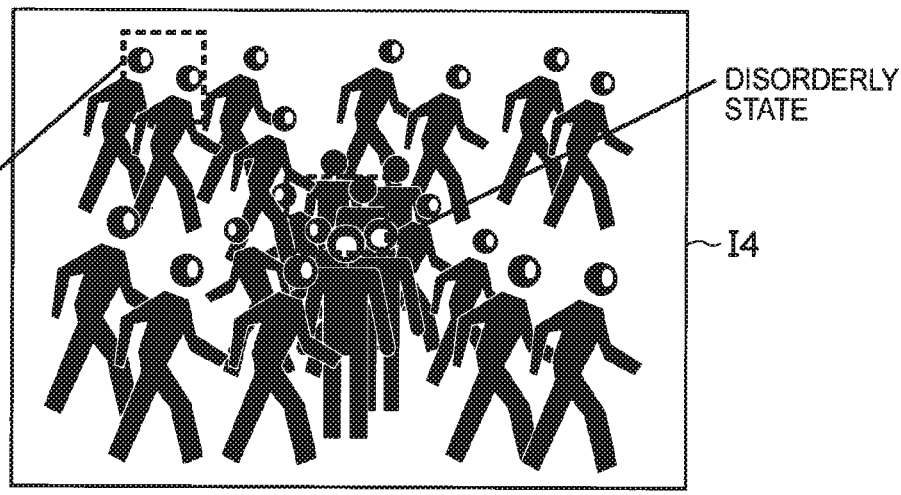
FIG. 6 is an explanatory diagram depicting a specific example of a crowd state image and a crowd state label.

Likewise, suppose the training data generation means 11 generates each crowd state image based on a generation instruction designating whether the facing directions of persons are orderly, as depicted in FIG. 6. In this case, the designated orderliness/non-orderliness is used as the label indicating the crowd state. For example, the training data generation means 11 may add a label "directions of persons: non-uniform" to a crowd state image having directional disorder, and add a label "directions of persons: uniform" to a crowd state image having directional order. By generating such a label as training data, for example when recognizing a crowd from an image I4 depicted in FIG. 6, which of the crowds included in the image has directional order can be specified, too.

After generating the crowd state label, the training data generation means 11 generates, for the crowd state image, a label (crowd position label) indicating information enabling the positions of the plurality of persons to be specified, from the crowd state image generation instruction and the information of person region images stored in the person position information storage means 23. The training data generation means 11 stores the generated crowd state image, crowd state label, and crowd position label in the training data storage means 25 as training data.

Figure 7:
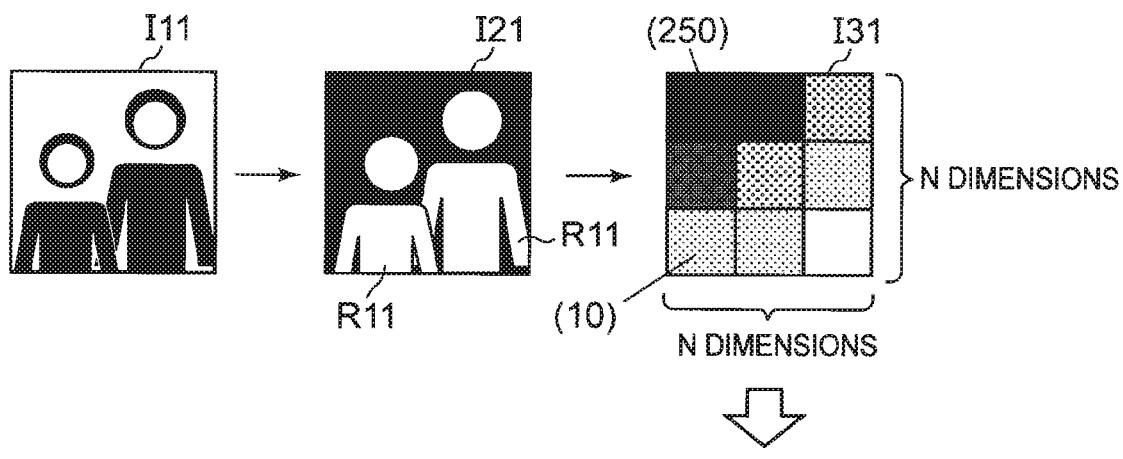
FIG. 7 is an explanatory diagram depicting an example of a method of generating a crowd position label.
Figure 8:
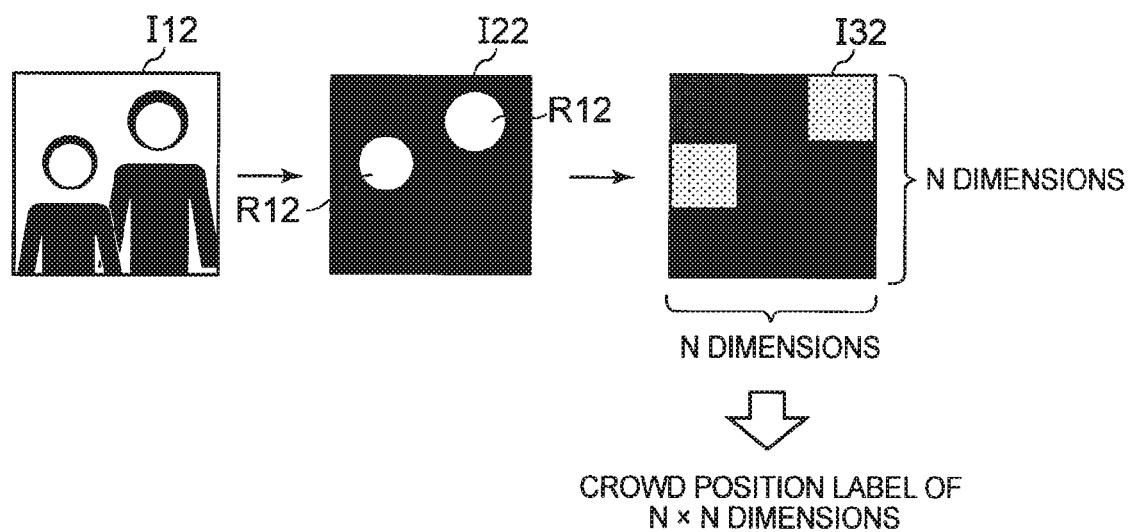
FIG. 8 is an explanatory diagram depicting an example of a method of generating a crowd position label.
Figure 9:
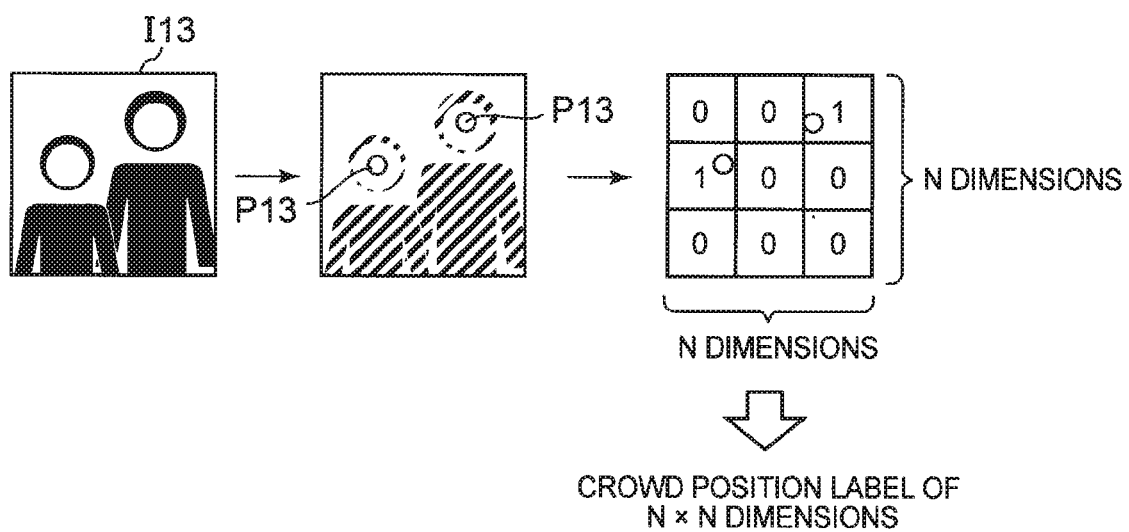
FIG. 9 is an explanatory diagram depicting an example of a method of generating a crowd position label.

Specific examples of a method of generating a crowd position label will be described below. FIGS. 7 to 14 are each an explanatory diagram depicting an example of a method of generating a crowd position label. FIGS. 7, 8, and 9 each depict a specific example of a method of generating a crowd position label of N×N dimensions.

As depicted in FIG. 7, the training data generation means 11 may generate, for a crowd state image I11, an image (crowd region image) I21 of a crowd region made up of person regions R11 of a plurality of persons, based on the instruction stored in the generation instruction storage means 24 and the person region images stored in the person position information storage means 23. In this case, the training data generation means 11 divides the generated image into predetermined N×N equal regions, calculates average luminance for each divided region, and generates a quantization image I31. The training data generation means 11 then acquires luminance values (e.g. 250, 10, etc. in FIG. 7) of N×N dimensions from the quantization image I31, and sets the values as a label (crowd position label) indicating information enabling the positions of the plurality of persons to be specified. When generating the quantization image, the training data generation means 11 may use maximum (max) luminance or the like instead of average luminance.

As depicted in FIG. 8, the training data generation means 11 may generate, for a crowd state image I12, an image (crowd region image) I22 of a crowd region made up of head regions R12 of a plurality of persons, based on the instruction stored in the generation instruction storage means 24, the person region images stored in the person position information storage means 23, and the head rectangles added to the person region images. In this case, the training data generation means 11 divides the generated image into predetermined N×N equal regions, calculates average luminance for each divided region, and generates a quantization image I32. The training data generation means 11 then acquires luminance values of N×N dimensions from the quantization image I32, and sets the values as a label (crowd position label) indicating information enabling the positions of the plurality of persons to be specified. When generating the quantization image, the training data generation means 11 may use maximum (max) luminance or the like instead of average luminance.

As depicted in FIG. 9, the training data generation means 11 may generate head positions P13 for a crowd state image I13, based on the instruction stored in the generation instruction storage means 24 and the head positions added to the person region images stored in the person position information storage means 23. In this case, the training data generation means 11 divides the crowd state image I13 into predetermined N×N equal regions, and counts the number of head positions P13 in each divided region. The training data generation means 11 then acquires count values of N×N dimensions from the count results, and sets the values as a label (crowd position label) indicating information enabling the positions of the plurality of persons to be specified.

Figure 10:
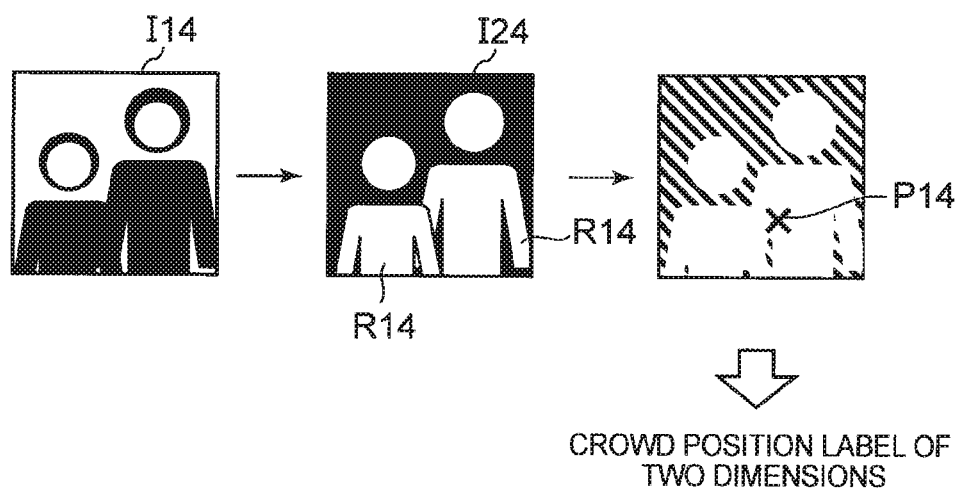
FIG. 10 is an explanatory diagram depicting an example of a method of generating a crowd position label.
Figure 11:
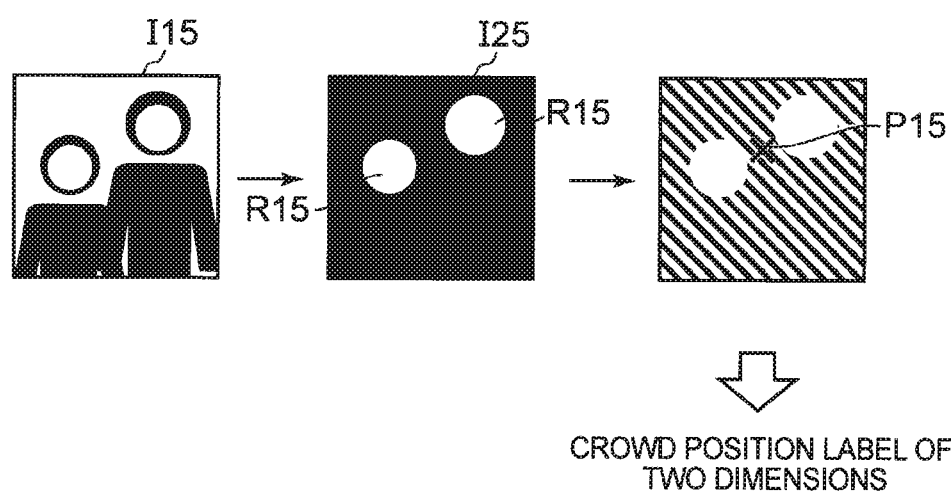
FIG. 11 is an explanatory diagram depicting an example of a method of generating a crowd position label.
Figure 12:
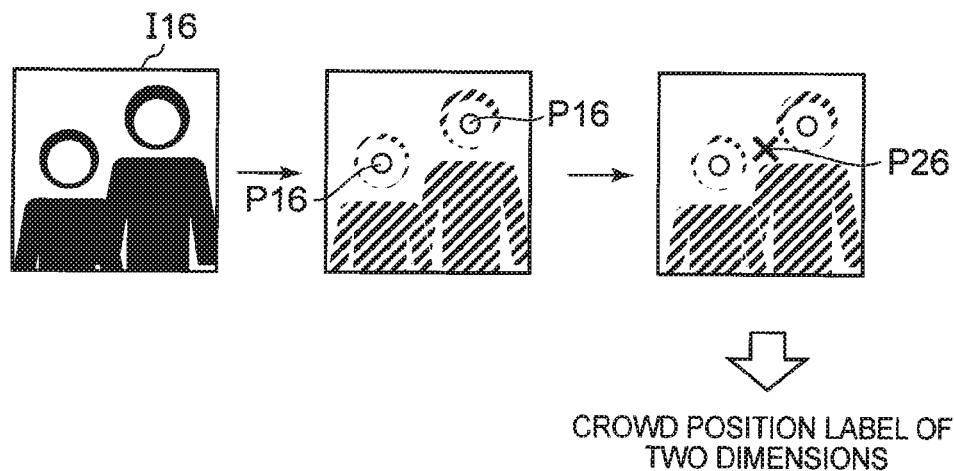
FIG. 12 is an explanatory diagram depicting an example of a method of generating a crowd position label.

FIGS. 10, 11, and 12 each depict a specific example of a method of generating a crowd position label of two dimensions. As depicted in FIG. 10, the training data generation means 11 may generate, for a crowd state image I14, an image (crowd region image) I24 of a crowd region made up of person regions R14 of a plurality of persons, based on the instruction stored in the generation instruction storage means 24 and the person region images stored in the person position information storage means 23. In this case, the training data generation means 11 calculates a barycentric position P14 for the person regions R14 from the generated crowd region image I24. The training data generation means 11 then acquires two-dimensional barycentric coordinates (x, y) from the calculation result, and sets the coordinates as a label (crowd position label) indicating information enabling the positions of the plurality of persons to be specified.

As depicted in FIG. 11, the training data generation means 11 may generate, for a crowd state image I15, an image (crowd region image) I25 of a crowd region made up of head regions R15 of a plurality of persons, based on the instruction stored in the generation instruction storage means 24, the person region images stored in the person position information storage means 23, and the head rectangles added to the person region images. In this case, the training data generation means 11 calculates a barycentric position P15 for the head regions R15 from the generated crowd region image I25. The training data generation means 11 then acquires two-dimensional barycentric coordinates (x, y) from the calculation result, and sets the coordinates as a label (crowd position label) indicating information enabling the positions of the plurality of persons to be specified.

As depicted in FIG. 12, the training data generation means 11 may calculate head positions P16 for a crowd state image I16, based on the instruction stored in the generation instruction storage means 24 and the head positions added to the person region images stored in the person position information storage means 23. In this case, the training data generation means 11 calculates a barycentric position P26 from the calculated head positions P16 in the crowd state image I16. The training data generation means 11 then acquires two-dimensional barycentric coordinates (x, y) from the calculation result, and sets the coordinates as a label (crowd position label) indicating information enabling the positions of the plurality of persons to be specified.

Figure 13:
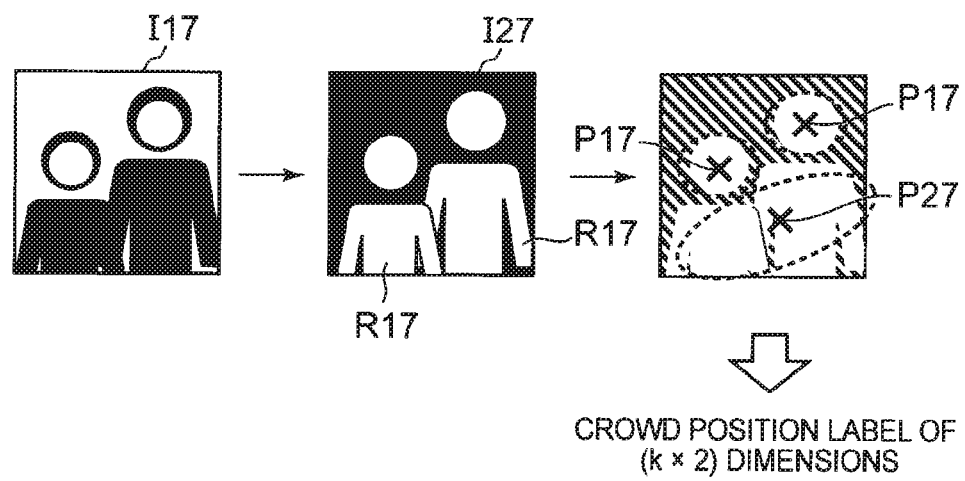
FIG. 13 is an explanatory diagram depicting an example of a method of generating a crowd position label.
Figure 14:
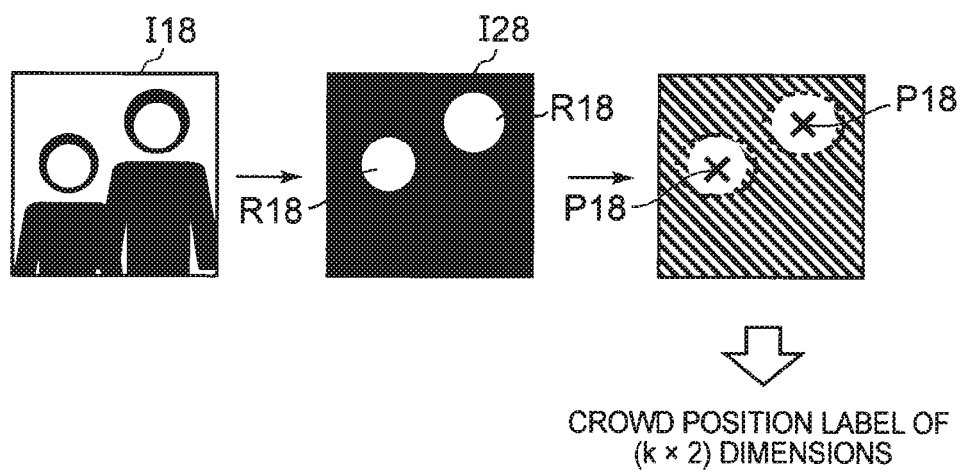
FIG. 14 is an explanatory diagram depicting an example of a method of generating a crowd position label.

FIGS. 13 and 14 each depict a specific example of a method of generating a crowd position label of (k×2) dimensions. As depicted in FIG. 13, the training data generation means 11 may generate, for a crowd state image I17, an image (crowd region image) I27 of a crowd region made up of person regions of a plurality of persons, based on the instruction stored in the generation instruction storage means 24 and the person region images stored in the person position information storage means 23. In this case, the training data generation means 11 partitions the person regions R17 in the generated crowd region image I27 into k clusters by k-means or the like, and calculates the center coordinates P17 $(x_k, y_k)$ of each cluster. The training data generation means 11 then acquires k two-dimensional center coordinates P27 from the calculation results, and sets the coordinate group as a label (crowd position label) indicating information enabling the positions of the plurality of persons to be specified.

The value of k may be a predetermined value set beforehand, or a value according to the number of persons in the crowd region image I27. The method of clustering is not limited to k-means described above.

As depicted in FIG. 14, the training data generation means 11 may generate, for a crowd state image I18, an image (crowd region image) I28 of a crowd region made up of head regions of a plurality of persons, based on the instruction stored in the generation instruction storage means 24, the person region images stored in the person position information storage means 23, and the head rectangles added to the person region images. In this case, the training data generation means 11 partitions the head regions R18 in the generated crowd region image I28 into k clusters by k-means or the like, and calculates the center coordinates P18 of each cluster. The training data generation means 11 then acquires k two-dimensional center coordinates P18 from the calculation results, and sets the coordinate group as a label (crowd position label) indicating information enabling the positions of the plurality of persons to be specified.

The value of k may be a predetermined value set beforehand, or a value according to the number of persons in the crowd region image I28, as described above with reference to FIG. 13. The method of clustering is not limited to k-means described above.

Although the specific examples of the method of generating a crowd position label have been described above with reference to FIGS. 7 to 14, the method of generating a crowd position label is not limited to the methods depicted in FIGS. 7 to 14. Any method capable of generating, for a crowd state image, a label indicating information enabling the positions of a plurality of persons to be specified is usable.

Although the above describes the case where the training data generation means 11 generates the crowd state image, the crowd state label, and the crowd position label using the information stored in the background image storage means 21, the person image storage means 22, the person position information storage means 23, and the generation instruction storage means 24, the training data generation means 11 may not use the information stored in the background image storage means 21, the person image storage means 22, the person position information storage means 23, and the generation instruction storage means 24. For example, the training data generation means 11 may generate the crowd state image, the crowd state label, and the crowd position label using computer graphics (CG) image synthesis and instruction information for synthesis.

The learning means 12 learns a discriminator for recognizing a crowd state from an image, using the crowd state images, the crowd state labels, and the crowd position labels stored in the training data storage means 25. The learning means 12 outputs a dictionary of the learned discriminator, to store it in the dictionary storage means 26. The learning means 12 also performs learning with a crowd state image as input and a crowd state label and a crowd position label as output.

Figure 15:
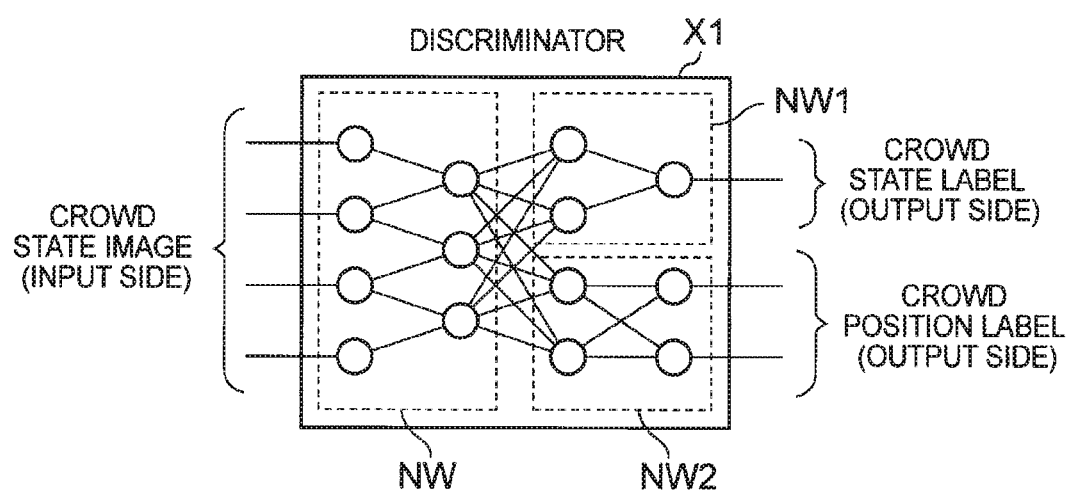
FIG. 15 is an explanatory diagram depicting an example of a discriminator used in crowd state recognition.

This exemplary embodiment assumes learning in a neural network. FIG. 15 is an explanatory diagram depicting an example of a discriminator used in crowd state recognition. The learning means 12 performs learning with a crowd state image as input and a crowd state label and a crowd position label as output. In the learning, a network NW common to the crowd state label and the crowd position label is set on the input side, and a network NW1 and a network NW2 independently provided respectively for the crowd state label and the crowd position label are set on the output side, as depicted in FIG. 15. The neural network learning method is widely known, and therefore its detailed description is omitted here.

The training data generation means 11 and the learning means 12 are implemented by a CPU of a computer operating according to a program (learning program). For example, the program may be stored in the storage device 2, with the CPU reading the program and, according to the program, operating as the training data generation means 11 and the learning means 12. Alternatively, the training data generation means 11 and the learning means 12 may each be implemented by dedicated hardware.

The crowd state recognition device according to this exemplary embodiment recognizes a crowd state from an image using a dictionary of a discriminator obtained as a result of learning and the discriminator. The crowd state recognition device depicted in FIG. 2 includes an image acquisition device 3 for acquiring a recognition object image (an image to be recognized), a data processing device 4 for operating according to program control, and a storage device 5 for storing information. The data processing device 4 will be described in detail later. The storage device 5 includes a dictionary storage means 51 and a network selection information storage means 52.

The dictionary storage means 51 is the same as the dictionary storage means 26 in FIG. 1, and therefore the description of the dictionary storage means 51 is omitted here. The network selection information storage means 52 stores information for selecting a network used in a discriminator of a crowd state recognition means 41 based on the dictionary stored in the dictionary storage means 51 when recognizing a crowd state. This information is hereafter also referred to as selection information or network selection information.

The storage device 5 (more specifically, the dictionary storage means 51 and the network selection information storage means 52) is implemented, for example, by a magnetic disk or the like.

The data processing device 4 includes the crowd state recognition means 41. The crowd state recognition means 41 recognizes and outputs a crowd state for the recognition object image acquired by the image acquisition device 3, using the discriminator based on the dictionary stored in the dictionary storage means 51. The discriminator used in the crowd state recognition means 41 has the recognition object image as input, and the crowd state and the crowd position as output. The discriminator has a network (common network) common to the crowd state and the crowd position on the input side, and networks (independent network) independently provided respectively for the crowd state and the crowd position on the output side.

The crowd state recognition means 41 selects networks used in the discriminator, based on the information (network selection information) stored in the network selection information storage means 52. The crowd state recognition means 41 may selectively output only the crowd state or both the crowd state and the crowd position.

For example, suppose the network selection information storage means 52 stores selection information to use only a common network NW and a network NW1 in a discriminator X1 depicted in FIG. 15. In this case, the crowd state recognition means 41 outputs only the crowd state. Suppose the network selection information storage means 52 stores selection information to use all networks. In this case, the crowd state recognition means 41 outputs the crowd state and the crowd position.

Figure 16:
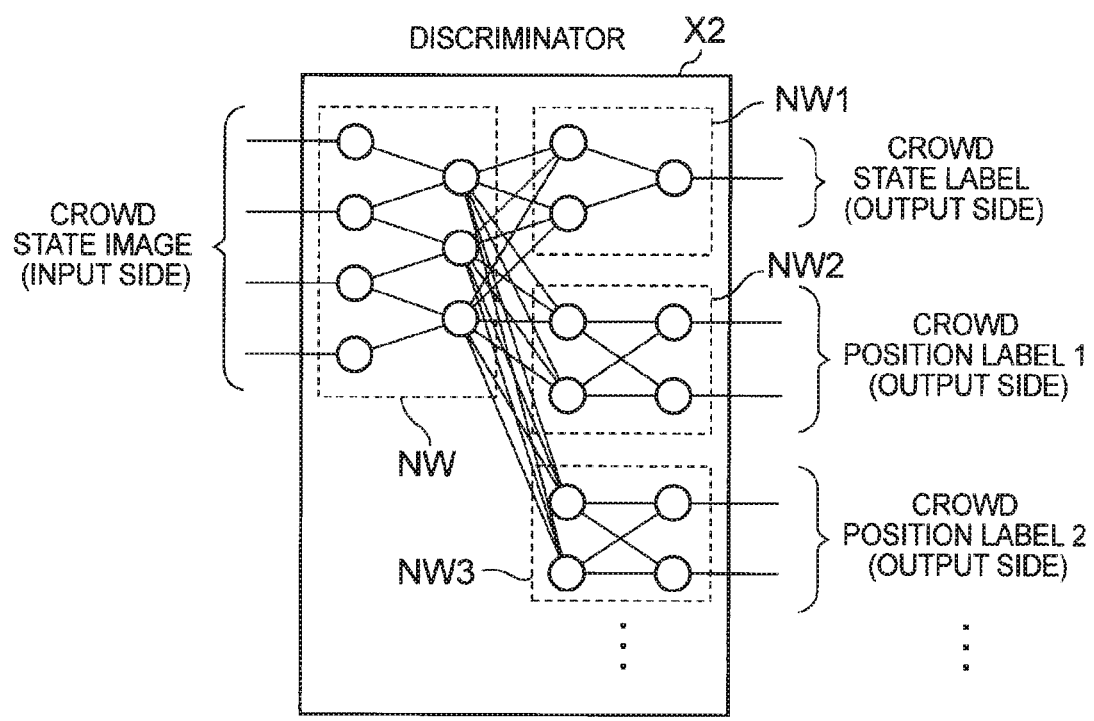
FIG. 16 is an explanatory diagram depicting another example of a discriminator used in crowd state recognition.

The form of the discriminator constructed is not limited to the form depicted in FIG. 15. FIG. 16 is an explanatory diagram depicting another example of a discriminator used in crowd state recognition. As depicted in FIG. 16, the crowd state recognition means 41 may construct a discriminator X2 that outputs a plurality of types of crowd positions, while the output of a crowd state is the same as in the discriminator X1. The discriminator may have independent networks for the respective plurality of crowd positions as output. In the case of using such a discriminator, the learning means 12 performs learning based on the structure depicted in FIG. 16. The plurality of crowd positions output here are, for example, selected from crowd positions in various forms depicted in FIGS. 7 to 14.

The crowd state recognition means 41 is implemented by a CPU of a computer operating according to a program (crowd state recognition program). For example, the program may be stored in the storage device 5, with the CPU reading the program and, according to the program, operating as the crowd state recognition means 41.

The image acquisition device 3, the data processing device 4, and the storage device 5 in this exemplary embodiment depicted in FIG. 2 may be integrally implemented by an IP camera (network camera). In this case, for example, the image acquisition device 3 is implemented as an imaging device, the IP camera includes the dictionary storage means 51 and the crowd state recognition means 41, and the crowd state recognition means 41 recognizes a crowd state and a crowd position from an image captured by the image acquisition means 3 using the foregoing discriminator.

Figure 17:
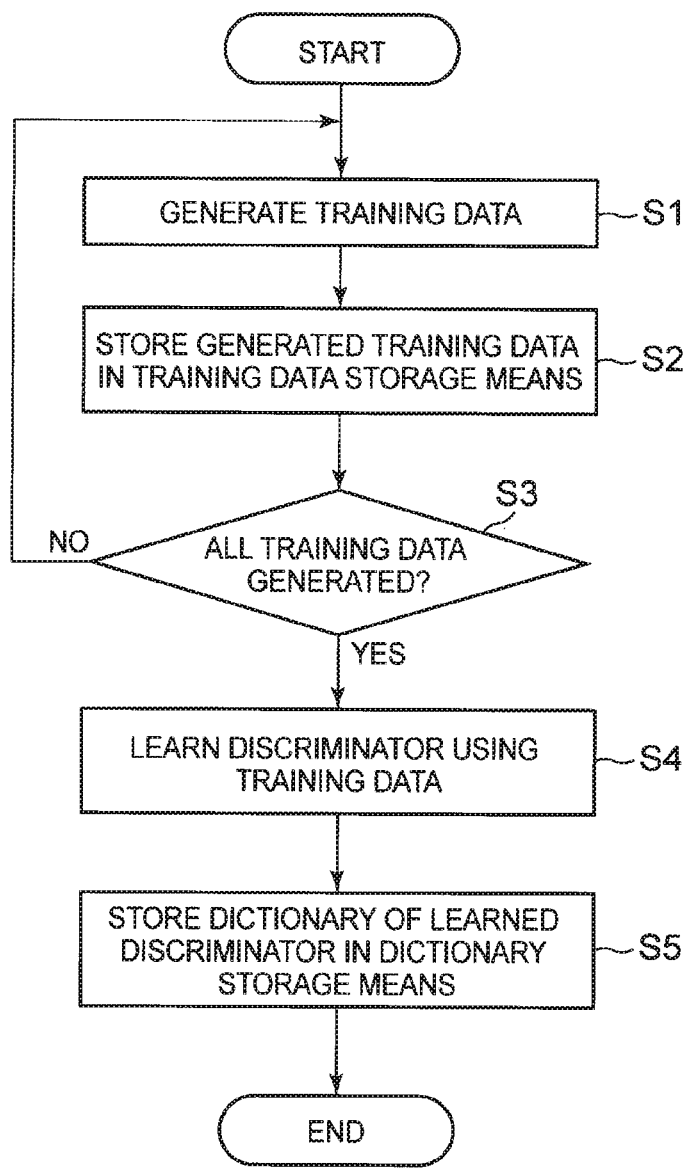
FIG. 17 is a flowchart depicting an example of the operation of the crowd state recognition device according to Exemplary Embodiment 1.

Operations according to this exemplary embodiment will be described below. As mentioned earlier, the data processing device 1 in this exemplary embodiment performs operation of learning training data for recognizing a state (crowd state) of a crowd made up of a plurality of persons from an image. The data processing device 4 in this exemplary embodiment performs operation of recognizing a crowd state from an image using a discriminator based on a dictionary obtained as a result of learning. The operation of learning training data for recognizing a state (crowd state) of a crowd made up of a plurality of persons from an image will be described below, with reference to FIG. 17. FIG. 17 is a flowchart depicting an example of the operation of the data processing device 1 in this exemplary embodiment.

The training data generation means 11 generates training data (step S1). Specifically, based on an instruction stored in the generation instruction storage means 24, the training data generation means 11 generates, as training data, an image of a crowd state and a label (crowd state label) indicating the crowd state of the image from information of background images, information of person images, and information of person region images. The training data generation means 11 additionally generates, as training data, a label (crowd position label) indicating information enabling the positions of the plurality of persons to be specified for the image of the crowd state, from the foregoing information. Here, the information of background images is stored in the background image storage means 21, the information of person images is stored in the person image storage means 22, and the information of person region images is stored in the person position information storage means 23.

The training data generation means 11 then stores the generated crowd state image, crowd state label, and crowd position label in the training data storage means 25 as training data (step S2). The training data generation means 11 determines whether all training data necessary for learning have been generated, with regard to the types and/or number of sets of training data (step S3). In the case where all training data have not been generated (step S3: No), the training data generation means 11 repeats the process of steps S1 to S3.

In the case where all training data have been generated (step S3: Yes), the learning means 12 learns a discriminator for recognizing a crowd state from an image, using, as training data, the crowd state images, the crowd state labels, and the crowd position labels stored in the training data storage means 25 (step S4). The learning means 12 stores a dictionary of the learned discriminator in the dictionary storage means 26 (step S5).

Figure 18:
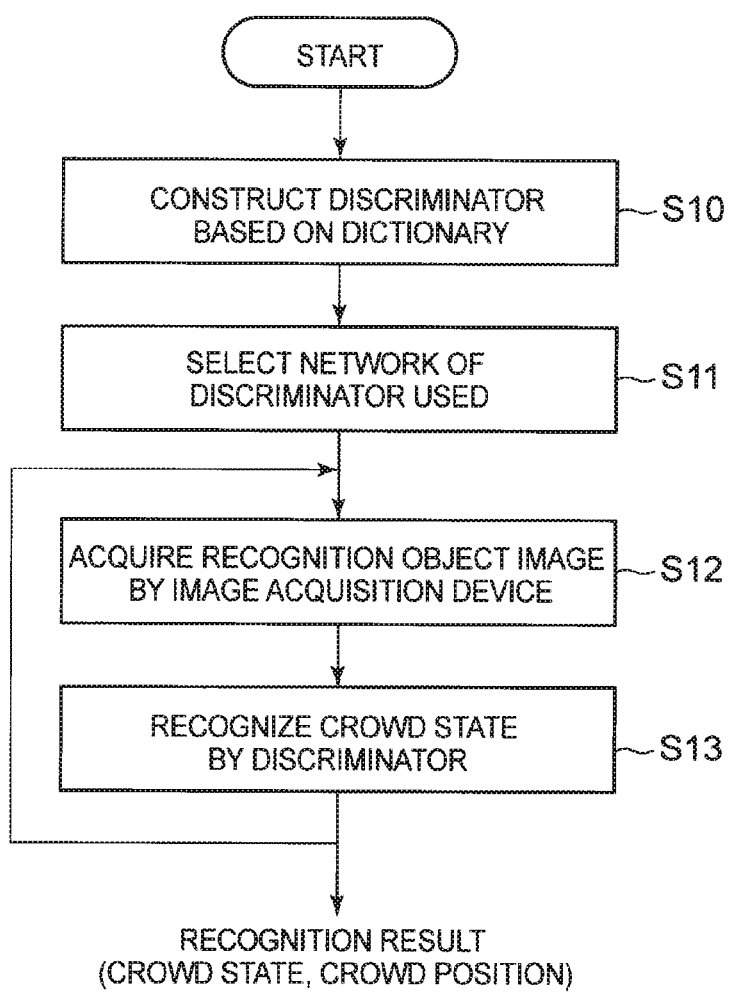
FIG. 18 is a flowchart depicting an example of the operation of the crowd state recognition device according to Exemplary Embodiment 1.

The operation of recognizing a crowd state from an image using a discriminator based on a dictionary obtained as a result of learning will be described below, with reference to FIG. 18. FIG. 18 is a flowchart depicting an example of the operation of the data processing device 4 in this exemplary embodiment.

The crowd state recognition means 41 constructs the discriminator used in the crowd state recognition means 41, based on the dictionary stored in the dictionary storage means 51 (step S10). The crowd state recognition means 41 then selects networks used in the discriminator, based on the information stored in the network selection information storage means 52 (step S11). After this, the image acquisition device 3 acquires a recognition object image (step S12).

Next, the crowd state recognition means 41 recognizes and outputs a crowd state for the recognition object image acquired by the image acquisition device 3, using the discriminator constructed based on the dictionary stored in the dictionary storage means 51 and network selection information (step S13). The network selection information used in the discriminator is the information (network selection information) stored in the network selection information storage means 52. The crowd state recognition means 41 may output a crowd position together with the crowd state, depending on the network selection information used in the discriminator. After outputting the recognition result, the data processing device 4 returns to step S12 to acquire the next recognition object image, and repeats the subsequent processes.

Advantageous effects according to this exemplary embodiment will be described below. In this exemplary embodiment, in addition to training data that are an image (crowd state image) of a crowd state made up of a plurality of persons and a label (crowd state label) indicating the crowd state of the image, a label (crowd position label) indicating information enabling the positions of the plurality of persons to be specified for the image of the crowd state is prepared as training data. The learning means 12 learns a discriminator having a crowd state image as input and a crowd state label as output and additionally having a crowd position label as output. With the added crowd position information, the amount of indirect information for learning which contributes to higher accuracy increases, so that recognition accuracy in crowd state recognition, i.e. recognition of a state of a crowd made up of a plurality of persons, can be improved.

Moreover, in this exemplary embodiment, the discriminator for recognizing a crowd state made up of a plurality of persons is formed by a neural network having a recognition object image as input and a crowd state and a crowd position as output. The neural network has a network common to the crowd state and the crowd position on the input side, and networks independently provided respectively for the crowd state and the crowd position on the output side. In learning, the learning means 12 uses all networks. In recognition, the crowd state recognition means 41 can select to use only the common network and the independent network for the crowd state. Thus, the crowd state can be recognized at high speed using only minimum necessary networks.

Moreover, in this exemplary embodiment, based on a crowd state image generation instruction, the training data generation means 11 generates, as basic training data for learning, an image (crowd state image) of a crowd state made up of a plurality of persons and a label (crowd state label) indicating the crowd state of the image from information of background images, information of person images, and information of person region images. The training data generation means 11 additionally generates, as indirect training data, a label (crowd position label) indicating information enabling the positions of the plurality of persons to be specified for the image of the crowd state. Since the indirect training data is generated based on the same information as in the generation of the basic training data without using special information, the indirect training data which contributes to a greater amount of information for learning can be easily generated without time and labor.

Moreover, in this exemplary embodiment, the discriminator for recognizing a crowd state is formed by a neural network having a recognition object image as input and a crowd state and a crowd position as output, as described above. The neural network has a network common to the crowd state and the crowd position on the input side, and networks independently provided respectively for the crowd state and the crowd position on the output side. Further, in the case where the discriminator is constructed to output a plurality of types of crowd positions, the learning means 12 constructs and learns independent networks for the respective plurality of types of crowd positions as output. With such added information of the plurality of types of crowd positions, the amount of indirect information for learning for crowd state recognition increases as compared with the case where one type of crowd position is used. Recognition accuracy in crowd state recognition can thus be further improved.

Moreover, in this exemplary embodiment, the discriminator for recognizing a crowd state made up of a plurality of persons has a recognition object image as input and a crowd state and a crowd position as output. Hence, in recognition, not only a state (crowd state) of a crowd made up of a plurality of persons but also information (crowd position) enabling the positions of the plurality of persons (crowd) to be specified can be obtained as a recognition result.

As described above, in this exemplary embodiment, the learning means 12 learns a discriminator having a crowd state image as input and a crowd state label and a crowd position label as output, using training data including a crowd state image, a crowd state label, and a crowd position label. The use of this discriminator can improve crowd state recognition accuracy.

Moreover, in this exemplary embodiment, the crowd state recognition means 41 recognizes a crowd state and a crowd position from a recognition object image, using a discriminator that is based on a dictionary represented by a network structure forming a neural network and a weight and bias of a network and that has a common network common to the crowd state and the crowd position on the input side of the neural network and independent networks independently provided respectively for the crowd state and the crowd position on the output side of the neural network. With such a structure, accuracy in recognizing a state of a crowd made up of a plurality of persons can be improved.

Exemplary Embodiment 2

Figure 19:
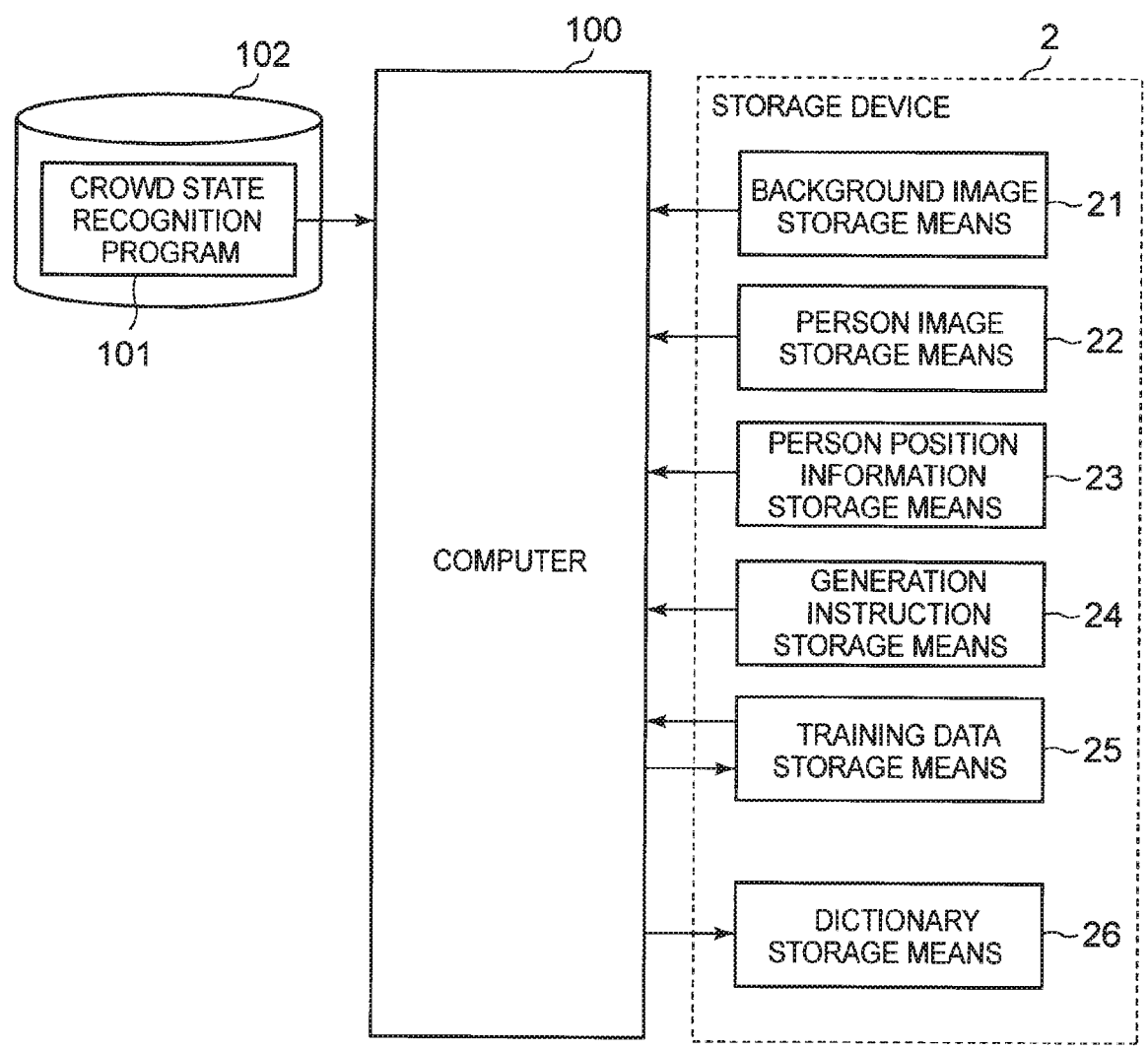
FIG. 19 is a block diagram depicting an example of the structure of Exemplary Embodiment 2 of a crowd state recognition device according to the present invention.
Figure 20:
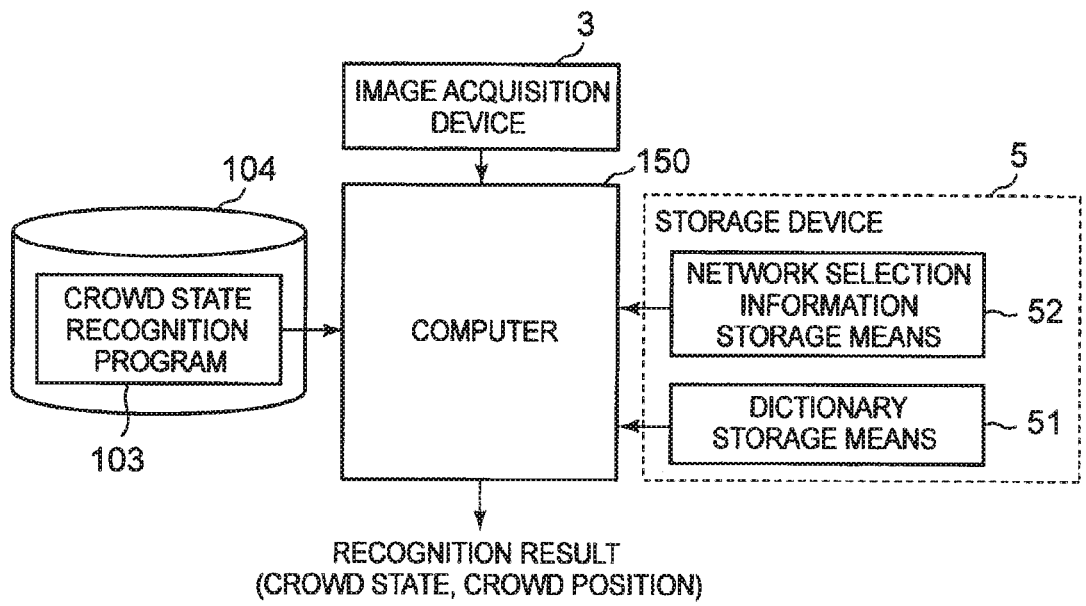
FIG. 20 is a block diagram depicting an example of the structure of Exemplary Embodiment 2 of a crowd state recognition device according to the present invention.

Exemplary Embodiment 2 of a crowd state recognition device according to the present invention will be described below. FIGS. 19 and 20 are each a block diagram depicting an example of the structure of part of the crowd state recognition device according to Exemplary Embodiment 2. The single-headed arrows in FIGS. 19 and 20 simply represent information flow directions, and do not preclude bidirectionality.

The crowd state recognition device according to Exemplary Embodiment 2 can be divided between a device for learning training data for recognizing a state (crowd state) of a crowd made up of a plurality of persons from an image and a device for recognizing a crowd state from an image using a discriminator based on a dictionary obtained as a result of learning.

The device for learning training data for recognizing a state (crowd state) of a crowd made up of a plurality of persons from an image will be described below, with reference to FIG. 19. As depicted in FIG. 19, in the crowd state recognition device according to Exemplary Embodiment 2 of the present invention, the same storage device 2 as in Exemplary Embodiment 1 including the background image storage means 21, the person image storage means 22, the person position information storage means 23, the generation instruction storage means 24, the training data storage means 25, and the dictionary storage means 26 is connected to a computer 100. A computer-readable storage medium 102 storing a crowd state recognition program 101 is also connected to the computer 100.

The computer-readable storage medium 102 is implemented by a magnetic disk, semiconductor memory, or the like, and the crowd state recognition program 101 stored therein is read by the computer 100 upon startup of the computer 100, for example. By controlling the operation of the computer 100 according to this program, the computer 100 is caused to function as the training data generation means 11 and the learning means 12 in the data processing device 1 in Exemplary Embodiment 1 and perform the processes depicted in FIG. 17.

The device for recognizing a crowd state from an image using a discriminator based on a dictionary obtained as a result of learning will be described below, with reference to FIG. 20. As depicted in FIG. 20, in the crowd state recognition device according to Exemplary Embodiment 2 of the present invention, the same storage device 5 as in Exemplary Embodiment 1 including the dictionary storage means 51 and the network selection information storage means 52 is connected to a computer 150. A computer-readable storage medium 104 storing a crowd state recognition program 103 is also connected to the computer 150.

The computer-readable storage medium 104 is implemented by a magnetic disk, semiconductor memory, or the like, and the crowd state recognition program 103 stored therein is read by the computer 150 upon startup of the computer 150, for example. By controlling the operation of the computer 150 according to this program, the computer 150 is caused to function as the crowd state recognition means 41 in the data processing device 4 in Exemplary Embodiment 1 and perform the processes depicted in FIG. 18.

In Exemplary Embodiments 1 and 2, the crowd state recognition device recognizes a state (crowd state) of a crowd made up of a plurality of persons. The object of recognition by the crowd state recognition device is, however, not limited to persons, and may be any things. That is, the term "person" in the description of the recognition object may be replaced with "thing". In this case, the above description concerning persons can be interpreted as concerning things.

Figure 21:
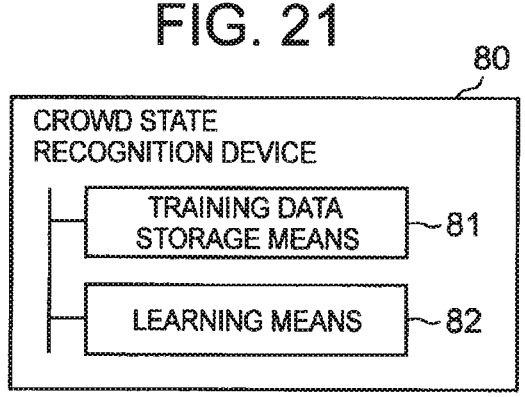
FIG. 21 is a block diagram depicting an overview of a crowd state recognition device according to the present invention.

An overview of the present invention will be given below. FIG. 21 is a block diagram depicting an overview of a crowd state recognition device according to the present invention. A crowd state recognition device 80 depicted in FIG. 21 includes: a training data storage means 81 (e.g. the training data storage means 25) for storing, as training data, a crowd state image that is a captured image of a crowd state made up of a plurality of persons, a crowd state label that is a label indicating the crowd state of the image, and a crowd position label that is a label indicating information enabling positions of the plurality of persons included in the crowd state image to be specified; and a learning means 82 (e.g. the learning means 12) for learning a discriminator for recognizing the crowd state from a recognition object image.

The learning means 82 learns the discriminator having the crowd state image as input and the crowd state label and the crowd position label as output, using the training data stored in the training data storage means 81.

With such a structure, accuracy in recognizing a state of a crowd made up of a plurality of persons can be improved.

The discriminator may be formed by a neural network, and have a common network common to the crowd state label and the crowd position label on an input side of the neural network and independent networks independently provided respectively for the crowd state label and the crowd position label on an output side of the neural network.

Figure 22:
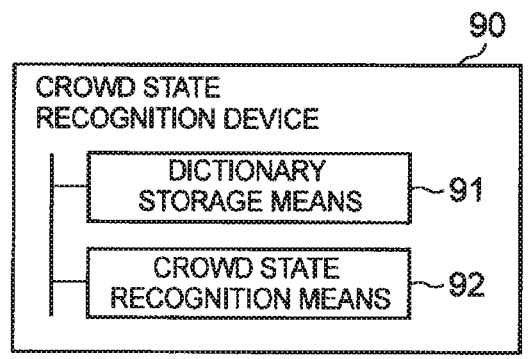
FIG. 22 is a block diagram depicting an overview of a crowd state recognition device according to the present invention.

FIG. 22 is a block diagram depicting another overview of a crowd state recognition device according to the present invention. A crowd state recognition device 90 depicted in FIG. 22 includes: a dictionary storage means 91 (e.g. the dictionary storage means 26) for storing a dictionary represented by a network structure forming a neural network and a weight and a bias of a network, as a dictionary used in a discriminator for recognizing a crowd state from an image; and a crowd state recognition means 92 (e.g. the crowd state recognition means 41) for recognizing a crowd state and a crowd position from a recognition object image, using a discriminator that has the recognition object image as input and the crowd state and the crowd position as output, is based on the dictionary stored in the dictionary storage means 91, and has a common network common to the crowd state and the crowd position on an input side of the neural network and independent networks independently provided respectively for the crowd state and the crowd position on an output side of the neural network.

With such a structure, too, accuracy in recognizing a state of a crowd made up of a plurality of persons can be improved.

The crowd state recognition device 90 may include a network selection information storage means (e.g. the network selection information storage means 52) for storing network selection information, wherein the crowd state recognition means 92 selects a common network and an independent network used in the discriminator based on the information stored in the network selection information storage means, and selectively recognizes only the crowd state or both the crowd state and the crowd position.

The discriminator may have a plurality of types of crowd positions as output, and have independent networks independently provided respectively for the plurality of types of crowd positions to be output.

The crowd state recognition device 80 and the crowd state recognition device 90 may include a training data generation means (e.g. the training data generation means 11) for generating, based on a generation instruction to generate the crowd state image, the crowd state image, the crowd state label, and the crowd position label as training data used to learn the discriminator, from information of background images, information of person images, and information of person region images of regions in which respective persons are captured in the person images.

The training data generation means may generate the crowd state label based on the generation instruction, and generate the crowd position label based on the generation instruction and the information of the person region images.

Information of each person region image may include the person region image and position information of a person in the person region image, and the position information of the person may include at least one of a center position of the person, a rectangle enclosing the person, a center position of a head of the person, and a rectangle enclosing the head.

All or part of the foregoing exemplary embodiments can be described as, but are not limited to, the following supplementary notes.

(Supplementary note 1) A crowd state recognition device including: a training data storage means which stores, as training data, a crowd state image that is a captured image of a crowd state made up of a plurality of persons, a crowd state label that is a label indicating the crowd state of the image, and a crowd position label that is a label indicating information enabling positions of the plurality of persons included in the crowd state image to be specified; and a learning means which learns a discriminator for recognizing the crowd state from a recognition object image, wherein the learning means learns the discriminator having the crowd state image as input and the crowd state label and the crowd position label as output, using the training data stored in the training data storage means.

(Supplementary note 2) The crowd state recognition device according to supplementary note 1, wherein the discriminator is formed by a neural network, and has a common network common to the crowd state label and the crowd position label on an input side of the neural network and independent networks independently provided respectively for the crowd state label and the crowd position label on an output side of the neural network.

(Supplementary note 3) A crowd state recognition device including: a dictionary storage means which stores a dictionary represented by a network structure forming a neural network and a weight and a bias of a network, as a dictionary used in a discriminator for recognizing a crowd state from an image; and a crowd state recognition means which recognizes a crowd state and a crowd position from a recognition object image, using a discriminator that has the recognition object image as input and the crowd state and the crowd position as output, is based on the dictionary stored in the dictionary storage means, and has a common network common to the crowd state and the crowd position on an input side of the neural network and independent networks independently provided respectively for the crowd state and the crowd position on an output side of the neural network.

(Supplementary note 4) The crowd state recognition device according to supplementary note 3, including a network selection information storage means which stores network selection information, wherein the crowd state recognition means selects a common network and an independent network used in the discriminator based on the information stored in the network selection information storage means, and selectively recognizes only the crowd state or both the crowd state and the crowd position.

(Supplementary note 5) The crowd state recognition device according to any one of supplementary notes 2 to 4, wherein the discriminator has a plurality of types of crowd positions as output, and has independent networks independently provided respectively for the plurality of types of crowd positions to be output.

(Supplementary note 6) The crowd state recognition device according to any one of supplementary notes 1 to 5, including a training data generation means which generates, based on a generation instruction to generate the crowd state image, the crowd state image, the crowd state label, and the crowd position label as training data used to learn the discriminator, from information of background images, information of person images, and information of person region images of regions in which respective persons are captured in the person images.

(Supplementary note 7) The crowd state recognition device according to supplementary note 6, wherein the training data generation means generates the crowd state label based on the generation instruction, and generates the crowd position label based on the generation instruction and the information of the person region images.

(Supplementary note 8) The crowd state recognition device according to supplementary note 6 or 7, wherein information of each person region image includes the person region image and position information of a person in the person region image, and the position information of the person includes at least one of a center position of the person, a rectangle enclosing the person, a center position of a head of the person, and a rectangle enclosing the head.

(Supplementary note 9) The crowd state recognition device according to supplementary note 6 or 7, wherein the training data generation means generates, based on the generation instruction and the person region images, an image of a crowd region made up of person regions of a plurality of persons for the crowd state image, divides the generated image of the crowd region into predetermined N×N equal regions, calculates average luminance for each divided region, and sets calculated luminance values of N×N dimensions as the crowd position label.

(Supplementary note 10) The crowd state recognition device according to supplementary note 6 or 7, wherein the training data generation means generates, based on the generation instruction, the person region images, and information indicating a head rectangle added to each of the person region images, an image of a crowd region made up of head regions of a plurality of persons for the crowd state image, divides the generated image of the crowd region into predetermined N×N equal regions, calculates average luminance for each divided region, and sets calculated luminance values of N×N dimensions as the crowd position label.

(Supplementary note 11) A learning method for learning a discriminator for recognizing a crowd state made up of a plurality of persons from a recognition object image, the learning method including learning, with use of training data including a crowd state image that is a captured image of the crowd state, a crowd state label that is a label indicating the crowd state of the image, and a crowd position label that is a label indicating information enabling positions of the plurality of persons included in the crowd state image to be specified, the discriminator having the crowd state image as input and the crowd state label and the crowd position label as output.

(Supplementary note 12) The learning method according to supplementary note 11, wherein the discriminator is formed by a neural network, and has a common network common to the crowd state label and the crowd position label on an input side of the neural network and independent networks independently provided respectively for the crowd state label and the crowd position label on an output side of the neural network.

(Supplementary note 13) A crowd state recognition method including recognizing a crowd state and a crowd position from a recognition object image, using a discriminator that has the recognition object image as input and the crowd state and the crowd position as output, is based on a dictionary represented by a network structure forming a neural network and a weight and a bias of a network, and has a common network common to the crowd state and the crowd position on an input side of the neural network and independent networks independently provided respectively for the crowd state and the crowd position on an output side of the neural network.

(Supplementary note 14) The crowd state recognition method according to supplementary note 13, including selecting a common network and an independent network used in the discriminator based on network selection information, and selectively recognizing only the crowd state or both the crowd state and the crowd position.

(Supplementary note 15) A learning program for use in a computer for learning a discriminator for recognizing a crowd state made up of a plurality of persons from a recognition object image, the learning program causing the computer to execute a learning process of learning, with use of training data including a crowd state image that is a captured image of the crowd state, a crowd state label that is a label indicating the crowd state of the image, and a crowd position label that is a label indicating information enabling positions of the plurality of persons included in the crowd state image to be specified, the discriminator having the crowd state image as input and the crowd state label and the crowd position label as output.

(Supplementary note 16) The learning program according to supplementary note 15, wherein the discriminator is formed by a neural network, and has a common network common to the crowd state label and the crowd position label on an input side of the neural network and independent networks independently provided respectively for the crowd state label and the crowd position label on an output side of the neural network.

(Supplementary note 17) A crowd state recognition program for causing a computer to execute a crowd state recognition process of recognizing a crowd state and a crowd position from a recognition object image, using a discriminator that has the recognition object image as input and the crowd state and the crowd position as output, is based on a dictionary represented by a network structure forming a neural network and a weight and a bias of a network, and has a common network common to the crowd state and the crowd position on an input side of the neural network and independent networks independently provided respectively for the crowd state and the crowd position on an output side of the neural network.

(Supplementary note 18) The crowd state recognition program according to supplementary note 17, causing the computer to, in the crowd state recognition process, select a common network and an independent network used in the discriminator based on network selection information, and selectively recognize only the crowd state or both the crowd state and the crowd position.

INDUSTRIAL APPLICABILITY

The present invention is suitable for use as a crowd state recognition device for recognizing a state of a crowd made up of a plurality of persons, a crowd state recognition device that can improve recognition accuracy in the device for recognizing a state of a crowd, and a program for implementing these crowd state recognition devices by a computer.

The present invention is also suitable for use as a device for performing recognition of suspicious persons, recognition of suspicious objects that have been left, recognition of tailgating, recognition of abnormal states, recognition of abnormal behaviors, etc., in the field of surveillance which requires crowd state recognition from camera video or stored video.

The present invention is also suitable for use as a device for performing flow line analysis, behavior analysis, etc. in the field of marketing. The present invention is also suitable for use as an input interface that recognizes a crowd state from camera video or stored video and has the recognition result and the corresponding position (2D, 3D) as input. The present invention is also suitable for use as, for example, a video search device having a crowd state recognition result and the corresponding position (2D, 3D) as a trigger or a key.

Although the present invention has been described with reference to the foregoing exemplary embodiments and examples, the present invention is not limited to the foregoing exemplary embodiments and examples. Various changes understandable by those skilled in the art can be made to the structures and details of the present invention within the scope of the present invention.

REFERENCE SIGNS LIST 1 data processing device
2 storage device 3 image acquisition device
4 data processing device
5 storage device
11 training data generation means
12 learning means
21 background image storage means
22 person image storage means
23 person position information storage means
24 generation instruction storage means
25 training data storage means
26 dictionary storage means
41 crowd state recognition means
51 dictionary storage means
52 network selection information storage means
100, 150 computer
101, 103 crowd state recognition program
102, 104 computer-readable storage medium

The invention claimed is:

1. A crowd state recognition device comprising:
a training data storage unit which stores, as training data, a crowd state image that is a captured image of a crowd state made up of a plurality of persons, a crowd state label that is a label indicating the crowd state of the image, and a crowd position label that is a label indicating information enabling positions of the plurality of persons included in the crowd state image to be specified; and
a hardware processor configured to execute a software code to:
learn a discriminator, which is a mathematical model, for recognizing the crowd state from a recognition object image,
wherein the hardware processor is configured to execute the software code to learn the discriminator having the crowd state image as input and the crowd state label and the crowd position label as output, using the training data stored in the training data storage unit.

2. The crowd state recognition device according to claim 1, wherein the discriminator is formed by a neural network, and has a common network common to the crowd state label and the crowd position label on an input side of the neural network and independent networks independently provided respectively for the crowd state label and the crowd position label on an output side of the neural network.

3. The crowd state recognition device according to claim 2, wherein the discriminator has a plurality of types of crowd positions as output, and has independent networks independently provided respectively for the plurality of types of crowd positions to be output.

4. The crowd state recognition device according to claim 1,
wherein the hardware processor is configured to execute the software code to generate, based on a generation instruction to generate the crowd state image, the crowd state image, the crowd state label, and the crowd position label as training data used to learn the discriminator, from information of background images, information of person images, and information of person region images of regions in which respective persons are captured in the person images.

5. The crowd state recognition device according to claim 4, wherein the hardware processor is configured to execute the software code to generate the crowd state label based on the generation instruction, and generate the crowd position label based on the generation instruction and the information of the person region images.

6. The crowd state recognition device according to claim 4, wherein information of each person region image includes the person region image and position information of a person in the person region image, and the position information of the person includes at least one of a center position of the person, a rectangle enclosing the person, a center position of a head of the person, and a rectangle enclosing the head.

7. The crowd state recognition device according to claim 4, wherein the hardware processor is configured to execute the software code to generate, based on the generation instruction and the person region images, an image of a crowd region made up of person regions of a plurality of persons for the crowd state image, divide the generated image of the crowd region into predetermined N×N equal regions, calculate average luminance for each divided region, and set calculated luminance values of N×N dimensions as the crowd position label.

8. The crowd state recognition device according to claim 4, wherein the hardware processor is configured to execute the software code to generate, based on the generation instruction, the person region images, and information indicating a head rectangle added to each of the person region images, an image of a crowd region made up of head regions of a plurality of persons for the crowd state image, divide the generated image of the crowd region into predetermined N×N equal regions, calculate average luminance for each divided region, and sets calculated luminance values of N×N dimensions as the crowd position label.

9. The crowd state recognition device according to claim 1, wherein the hardware processor is configured to execute the software code to:
generate a crowd region image made up of the person regions of the plurality of persons,
calculate barycentric coordinates of the person regions or center coordinates of clusters calculated as a result of clustering the person regions from the generated crowd region image, and
generate the crowd position label from the calculated barycentric coordinates or center coordinates.

10. A crowd state recognition device comprising:
a dictionary storage unit which stores a dictionary represented by a network structure forming a neural network and a weight and a bias of a network, as a dictionary used in a discriminator for recognizing a crowd state from an image;
wherein the hardware processor is configured to execute the software code to recognize a crowd state and a crowd position from a recognition object image, using a discriminator that has the recognition object image as input and the crowd state and the crowd position as output, is based on the dictionary stored in the dictionary storage unit, and has a common network common to the crowd state and the crowd position on an input side of the neural network and independent networks independently provided respectively for the crowd state and the crowd position on an output side of the neural network.

11. The crowd state recognition device according to claim 10, comprising:
a network selection information storage unit which stores network selection information,
wherein the hardware processor is configured to execute the software code to select a common network and an independent network used in the discriminator based on the information stored in the network selection information storage unit, and selectively recognize only the crowd state or both the crowd state and the crowd position.

12. A learning method for learning, by a hardware processor, a discriminator for recognizing a crowd state made up of a plurality of persons from a recognition object image, the learning method comprising:

learning, with use of training data including a crowd state image that is a captured image of the crowd state, a crowd state label that is a label indicating the crowd state of the image, and a crowd position label that is a label indicating information enabling positions of the plurality of persons included in the crowd state image to be specified, the discriminator having the crowd state image as input and the crowd state label and the crowd position label as output.

13. The learning method according to claim 12, wherein the discriminator is formed by a neural network, and has a common network common to the crowd state label and the crowd position label on an input side of the neural network and independent networks independently provided respectively for the crowd state label and the crowd position label on an output side of the neural network.

* * * * *